United States Patent
Ackermann

Patent Number: 6,109,589
Date of Patent: Aug. 29, 2000

[54] ELECTRICAL ACTUATOR WITH A STABILIZING MAGNETOSTATIC TORQUE, AND A THROTTLE DEVICE PROVIDED WITH SUCH AN ACTUATOR

[75] Inventor: Bernd Ackermann, Aachen, Germany

[73] Assignee: U.S. Philips Corporation, New York, N.Y.

[21] Appl. No.: 09/067,911

[22] Filed: Apr. 28, 1998

[30] Foreign Application Priority Data

Apr. 28, 1997 [EP] European Pat. Off. ............... 9720127

[51] Int. Cl.⁷ .......................... F16K 31/04; H02K 1/17
[52] U.S. Cl. .................. 251/65; 251/129.11; 310/156; 310/254
[58] Field of Search ................ 251/129.11, 129.12, 251/65; 310/156, 254, 258

[56] References Cited

U.S. PATENT DOCUMENTS

| | | | |
|---|---|---|---|
| 4,580,761 | 4/1986 | Silcox et al. | 251/65 X |
| 4,915,074 | 4/1990 | Arai | 251/65 X |
| 5,158,262 | 10/1992 | Kamerbeek et al. | 251/65 X |
| 5,226,627 | 7/1993 | Hess et al. | 251/65 |
| 5,345,968 | 9/1994 | Day | 251/65 X |
| 5,624,100 | 4/1997 | Bolte et al. | 251/65 |
| 5,785,296 | 7/1998 | Peube et al. | 251/129.11 |
| 5,927,249 | 7/1999 | Ackermann et al. | 251/65 X |

*Primary Examiner*—John Rivell
*Attorney, Agent, or Firm*—Tony E. Piotrowski

[57] ABSTRACT

An electrical actuator (11, 85) comprises a magnetically permeable stator body (13) and a permanently magnetic rotor body (17) which is pivotable relative to the stator body (13) through a limited angle of rotation ($\phi$). The stator body (13) exerts a magnetostatic torque ($T_{MS}$) on the rotor body (17) and comprises electrical energizing means (29) for exerting an electromagnetic torque ($T_{EM}$) on the rotor body (17). $T_{EM}$ is substantially proportional to a value (I) of an electrical current through the energizing means (29) and depends on $\phi$ in accordance with a first function of $\phi$, while $T_{MS}$ depends on $\phi$ in accordance with a second function of $\phi$.

According to the invention, said first function is substantially different from said second function, while it is true for each position of equilibrium of the rotor body (17), in which the resultant $T_R$ of $T_{EM}$ and $T_{MS}$ is zero for a predetermined value I, that $T_R$ has a positive value if $\phi$ decreases and $T_R$ has a negative value if $\phi$ increases while I is constant. In this manner, the positions of equilibrium are stable and are each determined by a predetermined value of I. As a result, a comparatively simple analog control unit can be used for controlling the angle of rotation of the rotor body (17).

In a particular embodiment of the invention, the first function substantially corresponds to a $\cos(\phi)$ function and the second function substantially corresponds to a $-\sin(2\phi)$ function.

7 Claims, 4 Drawing Sheets

ELECTRICAL ACTUATOR WITH A STABILIZING MAGNETOSTATIC TORQUE, AND A THROTTLE DEVICE PROVIDED WITH SUCH AN ACTUATOR

BACKGROUND OF THE INVENTION

1. Field of the Invention

The invention relates to an electrical actuator comprising a magnetically permeable stator body and a permanently magnetic rotor body which is pivotable relative to the stator body about an axis of rotation through a limited angle of rotation, the stator body comprising electrical energizing means for exerting an electromagnetic torque on the rotor body, said electromagnetic torque being substantially proportional to a value of an electrical current through the energizing means and being dependent on an angle of rotation of the rotor body relative to the stator body in accordance with a first function of the angle of rotation, the stator body further exerting a magnetostatic torque on the rotor body which is dependent on the angle of rotation in accordance with a second function of the angle of rotation.

The invention also relates to a throttle device for use in an air inlet of an internal-combustion engine, which throttle device comprises a throttle-valve housing, an air passage which is connectable to the air inlet, a throttle valve which is journaled in the throttle-valve housing so as to be pivotable in the air passage, and an electrical actuator for pivoting the throttle valve.

2. Description of the Related Art

An electrical actuator and a throttle device of the kinds mentioned in the opening paragraph are known from WO-A-95/34903. The throttle valve of the known throttle device is pivotable in the air passage by means of the known actuator. The stator body of the known actuator is provided with permanent auxiliary magnets which exert an additional magnetostatic torque on the rotor body. Under the influence of said additional magnetostatic torque, the rotor body of the known actuator and the throttle valve coupled to the rotor body are urged into a rest position when no electrical current is supplied to the energizing means. When a current is supplied to the energizing means, the rotor body and the throttle valve are pivoted through a limited angle of rotation about the axis of rotation into an operational position under the influence of the electromagnetic torque exerted by the energizing means. The known actuator is provided with an electronic control unit for controlling the current through the energizing means. The control unit is provided with a feedback control loop comprising a sensor for measuring an actual value of the angle of rotation of the rotor body relative to the stator body. The control unit further comprises an electrical input for receiving an input signal which corresponds to a desired value of the angle of rotation. The control unit controls the current through the energizing means such that the actual value of the angle of rotation equals the desired value of the angle of rotation.

A disadvantage of the known actuator is that the operational positions into which the rotor body can be pivoted under the influence of the electromagnetic torque have a very low stability. As a result, the known actuator must be provided with a relatively complicated control unit, in particular a digital control unit, to avoid disturbances of the desired angle of rotation of the rotor body which may arise under the influence of, for example, external loads exerted on the throttle valve.

SUMMARY OF THE INVENTION

It is an object of the invention to provide an electrical actuator and a throttle device of the kinds mentioned in the opening paragraphs in which the disadvantages of the known electrical actuator and throttle device are avoided.

According to the invention, the electrical actuator is characterized in that the first function of the angle of rotation is substantially different from the second function thereof. For each position of equilibrium of the rotor body, in which the current has a predetermined value and the sum of the electromagnetic torque and the magnetostatic torque is substantially zero, said sum will have a negative value if the angle of rotation increases while said predetermined value of the current is maintained, and said sum will have a positive value if the angle of rotation decreases while said predetermined value of the current is maintained.

The first function relates the electromagnetic torque to the angle of rotation and the second function relates the magnetostatic torque to the angle of rotation. Since the two functions are substantially different, the position of equilibrium thereof, i.e. the angle of rotation of the rotor body relative to the stator body at which the sum of the electromagnetic torque and the magnetostatic torque is substantially zero, is determined by the value of the electrical current through the electrical means. Furthermore, since it holds for each position of equilibrium of the rotor body that the sum of the electromagnetic torque and the magnetostatic torque will have a negative value if the angle of rotation increases while the value of the current determining said position of equilibrium is maintained, and said sum will have a positive value if the angle of rotation decreases while the value of the current is maintained, the rotor body is urged back into the position of equilibrium under the influence of the resultant of the electromagnetic torque and the magnetostatic torque if the equilibrium position is disturbed under the influence of, for example, external loads on the rotor body. Therefore, the resultant of the electromagnetic torque and the magnetostatic torque has a stabilizing effect in each position of equilibrium of the rotor body. Since each position of equilibrium of the rotor body is determined by a predetermined value of the current and the resultant of the electromagnetic torque and the magnetostatic torque has a stabilizing effect in each position of equilibrium, the electrical actuator according to the invention can operate satisfactorily with a comparatively simple control unit such as, for example, a simple analog control unit for controlling the angle of rotation of the rotor body.

A particular embodiment of an electrical actuator according to the invention is characterized in that the stator body comprises a permanent auxiliary magnet for exerting an additional magnetostatic torque on the rotor body. The magnetostatic torque exerted by the stator body on the rotor body urges the rotor body into a rest position if no current is supplied to the energizing means. In said rest position, the rotor body rests against, for example, a mechanical stop with a force which is determined by the magnetostatic torque exerted on the rotor body in said rest position. The force with which the rotor body is urged into the rest position and rests against the mechanical stop in the rest position is increased by the additional magnetostatic torque of the auxiliary magnet, so that disturbances of the rest position of the rotor body, which may arise under the influence of external loads on the rotor body, are avoided as much as possible. The additional magnetostatic torque of the auxiliary magnet does not detract from the stabilizing properties of the resultant of the electromagnetic torque and the magnetostatic torque.

A special embodiment of an electrical actuator according to the invention is characterized in that the rotor body comprises a cylindrical permanent magnet which is diametrically magnetized, while the stator body comprises two pole shoes which are diametrically opposed on either side of the rotor body, the first function substantially corresponding to a $\cos(\phi)$ function and the second function substantially corresponding to a $-\sin(2\phi)$ function, wherein $\phi$ is the angle of rotation of the rotor body relative to the stator body. The $\cos(\phi)$ function is characteristic of the electromagnetic torque of an electrical actuator having a rotor body with a cylindrical diametrically magnetized permanent magnet and a stator body with two pole shoes diametrically opposed in relation to the rotor body, wherein $\phi=0°$ in a position in which the magnetic poles of the rotor body are situated in an imaginary plane of symmetry extending between the pole shoes of the stator body. An electrical actuator with a magnetostatic torque which depends on the angle of rotation in accordance with a $-\sin(2\phi)$ function offers a comparatively wide range of values of the angle of rotation in which the resultant of the electromagnetic torque and the magnetostatic torque has stabilizing properties, so that the electrical actuator has a comparatively wide operational range. Particularly, a stable operational range from almost $-90°$ to almost $+90°$ can be achieved with said $-\sin(2\phi)$ function, a one-to-one relation existing between the value of the current and the position of equilibrium of the rotor body throughout the entire operational range.

A further embodiment of an electrical actuator according to the invention is characterized in that the pole shoes comprise a first slot and a second slot, respectively, which are centrally provided in the respective pole shoes and are diametrically opposed in relation to the rotor body, while the pole shoes are mutually separated by a third slot and a fourth slot which are diametrically opposed in relation to the rotor body, the first, second, third and fourth slot having a substantially equal width, while the width of a gap present between each of the pole shoes and the rotor body on either side of the first and the second slot is substantially larger than the width of said gap on either side of the third and the fourth slot. By providing the stator body with said first, second, third and fourth slot and with said different gap widths between the pole shoes and the rotor body, the $-\sin(2\phi)$ function according to which the magnetostatic torque depends on the angle of rotation is achieved in a very simple and practical manner.

A still further embodiment of an electrical actuator according to the invention is characterized in that the pole shoes comprise a first slot and a second slot, respectively, which are centrally provided in the respective pole shoes and are diametrically opposed in relation to the rotor body, while the pole shoes are mutually separated by a third slot and a fourth slot which are diametrically opposed in relation to the rotor body, a width of the first and the second slot being substantially greater than a width of the third and the fourth slot. By providing the stator body with said first, second, third and fourth slot having said different slot widths, the $-\sin(2\phi)$ function according to which the magnetostatic torque depends on the angle of rotation is achieved in a very simple and practical manner.

A special embodiment of an electrical actuator according to the invention is characterized in that a first permanent auxiliary magnet is accommodated in the first slot and a second permanent auxiliary magnet is accommodated in the second slot, the first and the second auxiliary magnets being magnetized in equal directions, and the additional magnetostatic torque being dependent on the angle of rotation substantially in accordance with a $-\cos(\phi)$ function. By accommodating the auxiliary magnets in the first slot and the second slot, it is achieved that the auxiliary magnets are accommodated in a simple and practical manner in the stator body. The magnetostatic torque according to the $-\sin(2\phi)$ function results in a position of equilibrium of the rotor body at $\phi=0°$ if no current is supplied to the energizing means. Increasing said magnetostatic torque with an additional magnetostatic torque in accordance with a $-\cos(\phi)$ function achieves that the position of equilibrium of the rotor body which occurs when no current is supplied to the energizing means is situated between $\phi=-90°$ and $\phi=0°$. If the auxiliary magnets are given a suitable strength, a mechanical stop can be provided between $\phi=-90°$ and $\phi=0°$ which defines a rest position of the rotor body against which the rotor body is firmly urged when no current is supplied to the energizing means. When a current is supplied to the energizing means having a value which is larger than a predetermined threshold value, the rotor body is rotated from the rest position into an operational position, the angle of rotation of rotor body further increasing with an increasing value of the current, and a one-to-one relation existing between the value of the current and the angle of rotation at which the resultant of the electromagnetic torque, the magnetostatic torque, and the additional magnetostatic torque is zero throughout the entire operational range of the actuator.

BRIEF DESCRIPTION OF THE DRAWINGS

The invention will be explained in more detail below with reference to the drawings, in which FIG. 1 diagrammatically shows a throttle device according to the invention, used in an air intake of an internal-combustion engine.

DESCRIPTION OF THE PREFERRED EMBODIMENTS

Figure 1:
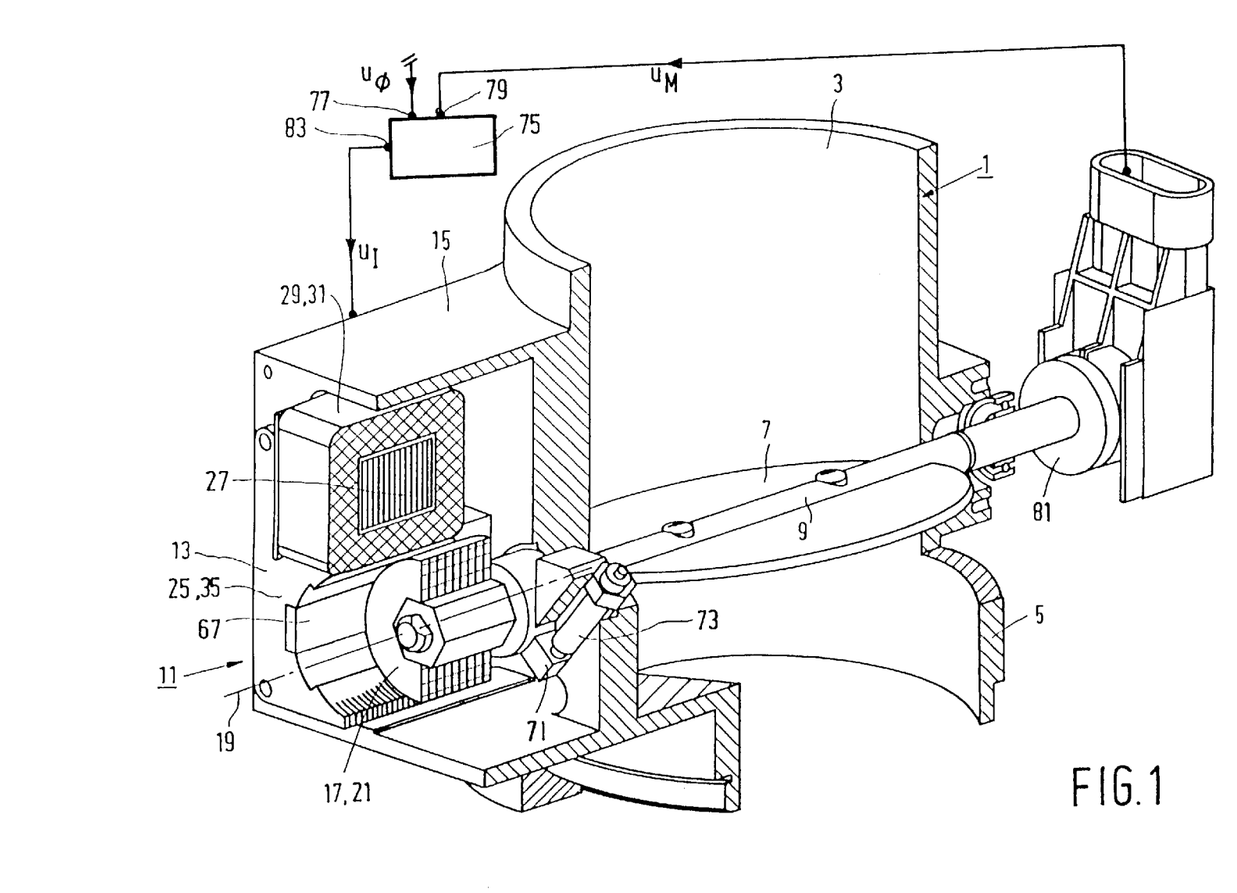

The throttle device according to the invention as shown in FIG. 1 comprises throttle-valve housing 1 with a tubular air passage 3 and a flange 5 by means of which the throttle device can be connected to an air inlet or manifold of an internal-combustion engine not shown in the drawing. The throttle device further comprises a disc-shaped throttle valve 7 which is mounted on a shaft 9 extending diametrically through the air passage 3. The shaft 9 is pivotably journaled in the flange 5 of the throttle-valve housing 1, so that the throttle valve 7 is pivotable in the air passage 3. When the throttle valve 7 is pivoted, the aperture of the air passage 3 and the air flow to the combustion chambers of the internal-combustion engine are altered.

Figure 2A:
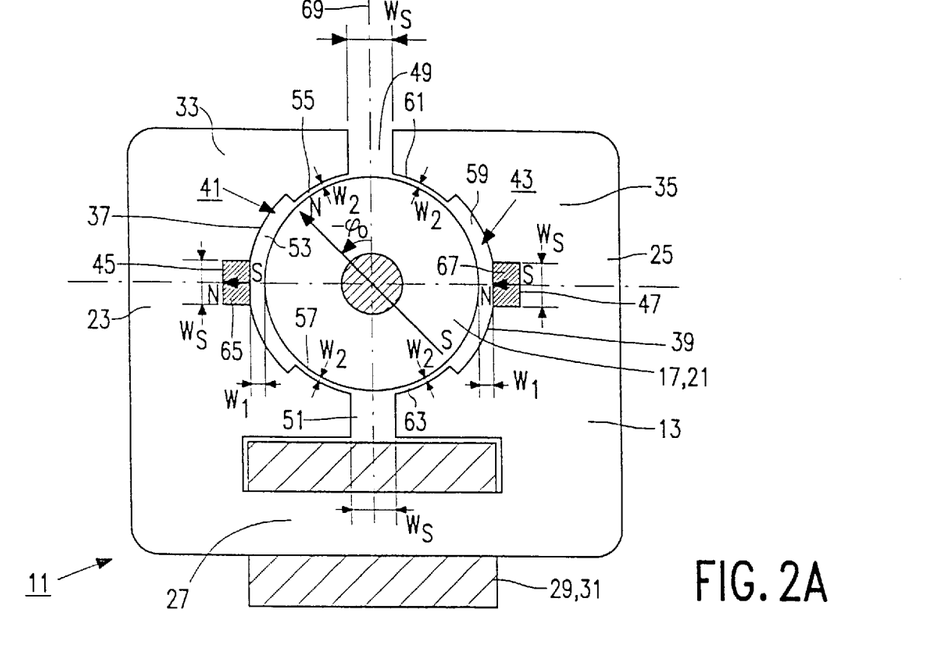
FIG. 2a is a cross-section of a first embodiment of an electrical actuator according to the invention, applied in the throttle device of FIG. 1, in a non-energized condition.
Figure 2B:
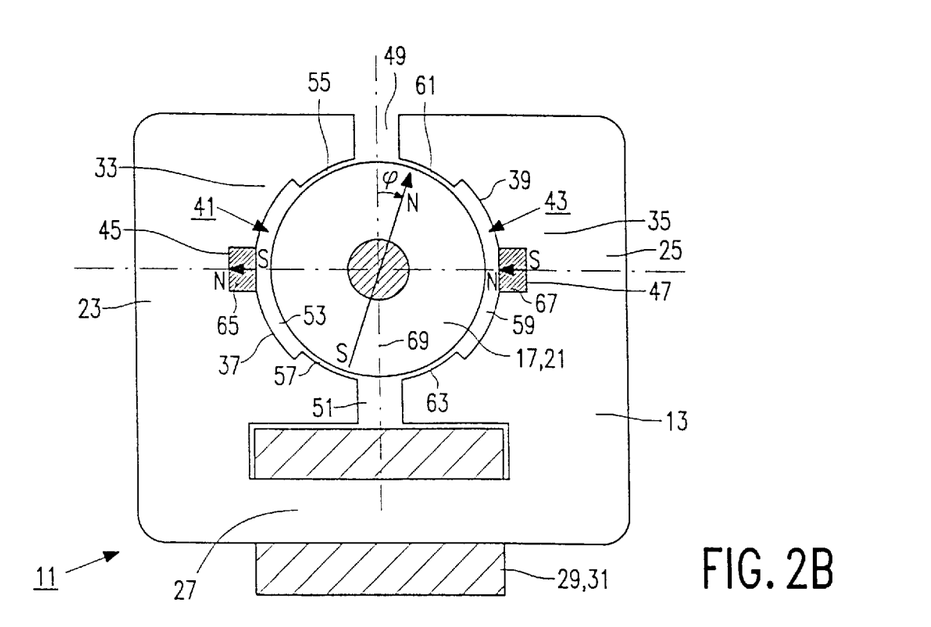
FIG. 2b shows the electrical actuator of FIG. 2a in an energized condition.

The throttle valve 7 is pivotable in the air passage 3 by means of an electrical actuator 11 according to the invention. The actuator 11 comprises a magnetically permeable stator body 13 which is mounted in an actuator housing 15 of the throttle-valve housing 1, and a permanently magnetic rotor body 17 which is mounted on the shaft 9 so as to be pivotable relative to the stator body 13 about an axis of rotation 19. As FIGS. 2a and 2b show, the rotor body 17 comprises a cylindrical permanent magnet 21 which is diametrically magnetized and has a north pole N and a south pole S. The stator body 13 is U-shaped and is made of a material having a high magnetic permeability such as, for example, sintered iron, or of magnetic-steel laminations. The U-shaped stator body 13 comprises two limbs 23, 25 which are interconnected by a base 27. The stator body 13 further comprises electrical energizing means 29 with an electrical coil 31 which is wound around and supported by the base 27 of the stator body 13. The limb 23 of the stator body 13 is provided with a pole shoe 33, and the limb 25 of the stator body 13 is provided with a pole shoe 35, the pole shoes 33, 35 being diametrically opposed o.e.s.o. the rotor body 17.

As FIGS. 2a and 2b further show, the pole shoe 33 has a curved surface 37 facing the rotor body 17, while the pole shoe 35 has a curved surface 39 facing the rotor body 17, the curved surfaces 37 and 39 partly surrounding the rotor body 17. A first slot 45 is centrally provided in the curved surface 37 of the pole shoe 33, while a second slot 47 is centrally provided in the curved surface 39 of the pole shoe 35, the first slot 45 and the second slot 47 being diametrically opposed in relation to the rotor body 17. Furthermore, the pole shoes 33, 35 are mutually separated by a third slot 49 situated at a side of the rotor body 17 remote from the energizing means 29, and by a fourth slot 51 situated at a side of the rotor body 17 facing the energizing means 29, the third slot 49 and the fourth slot 51 being diametrically opposed in relation to the rotor body 17. As shown in FIG. 2a, the first slot 45, the second slot 47, the third slot 49, and the fourth slot 51 have substantially equal slot widths $W_S$. Furthermore, the gap 41 present between the pole shoe 33 and the rotor body 17 has a first portion 53 which extends on either side of the first slot 45 and has a gap width $W_1$, a second portion 55 which extends between the first portion 53 and the third slot 49 and has a gap width $W_2$, and a third portion 57 which extends between the first portion 53 and the fourth slot 51 and also has a gap width $W_2$, the gap width $W_1$ of the first portion 53 being substantially greater than the gap width $W_2$ of the second portion 55 and the third portion 57. In the same manner, the gap 43 present between the pole shoe 35 and the rotor body 17 has a first portion 59 which extends on either side of the second slot 47 and has a gap width $W_1$, a second portion 61 which extends between the first portion 59 and the third slot 49 and has a gap width $W_2$, and a third portion 63 which extends between the first portion 59 and the fourth slot 51 and also has a gap width $W_2$. As FIGS. 2a and 2b further show, a first permanent auxiliary magnet 65 is accommodated in the first slot 45 and a second permanent auxiliary magnet 67 is accommodated in the second slot 47. The auxiliary magnets 65, 67 are magnetized in equal directions, the first auxiliary magnet 65 having a south pole S facing the rotor body 17 and a north pole N remote from the rotor body 17, and the second auxiliary magnet 67 having a north pole N facing the rotor body 17 and a south pole S remote from the rotor body 17.

During operation, a mechanical torque $T_R$ is exerted on the rotor body 17. The mechanical torque $T_R$ comprises an electromagnetic torque $T_{EM}$ exerted by the energizing means 29 on the rotor body 17 when an electrical current is supplied to the electrical coil 31, a magnetostatic torque $T_{MS}$ exerted by the magnetically permeable material of the stator body 13 on the rotor body 17, and an additional magnetostatic torque $T_{MM}$ exerted by the permanent auxiliary magnets 65, 67 on the rotor body 17. As a result of the use of the diametrically magnetized rotor body 17 and the two pole shoes 33, 35 diametrically opposed in relation to the rotor body 17, the electromagnetic torque $T_{EM}$ is substantially proportional to a value I of the current through the energizing means 29 and is dependent on an angle of rotation φ of the rotor body 17 relative to the stator body 13 substantially in accordance with value I of the current through the energizing means 29 and is dependent on an angle of rotation φ of the rotor body 17 relative to the stator body 13 substantially in accordance with a cos(φ) function, wherein φ=0° in a position in which the magnetic poles of the rotor body 17 are situated in an imaginary plane of symmetry 69 extending between the pole shoes 33, 35, and wherein φ>0° if the north pole N of the rotor body 17 faces the pole shoe 35, as indicated in FIGS. 2a and 2b. As a result of the use of the four slots 45, 47, 49, 51 having the substantially equal widths $W_S$ and the gaps 41, 43 having the gap widths $W_1$ on either side of the first slot 45 and the second slot 47 and the substantially smaller gap widths $W_2$ on either side of the third slot 49 and the fourth slot 51, the magnetostatic torque $T_{MS}$ is dependent on the angle of rotation φ substantially in accordance with a −sin(2φ) function. Furthermore, the additional magnetostatic torque $T_{MM}$ is dependent on the angle of rotation φ substantially in accordance with a −cos(φ) function as a result of the fact that the auxiliary magnets 65, 67 are accommodated in the first slot 45 and the second slot 47 which are diametrically opposed o.e.s.o the rotor body 17. Therefore, the resultant $T_R$ of the electromagnetic torque $T_{EM}$, the magnetostatic torque $T_{MS}$, and the additional magnetostatic torque $T_{MM}$ reads as follows:

$$T_R = T_{EM} + T_{MS} + T_{MM} \quad [1]$$
$$= k_{EM} \cdot I \cdot \cos(\phi) - k_{MS} \cdot \sin(2\phi) - k_{MM} \cdot \cos(\phi)$$
$$= k_{EM} \cdot \cos(\phi) \cdot \{I - k_{MM}/k_{EM} - 2 \cdot k_{MS}/k_{EM} \cdot \sin(\phi)\}$$

wherein $k_{EM}$, $k_{MS}$ and $k_{MM}$ are constant positive factors which are determined by the shape, the dimensions, and the physical and material properties of the rotor body 17, the stator body 13, the auxiliary magnets 65, 67, and the energizing means 29.

The use of the permanent auxiliary magnets 65, 67 has the following effect. It follows from equation [1] that in a non-energized condition of the actuator 11, wherein no current is supplied to the energizing means 29, the resultant $T_R$ would be negative for φ>0° and positive for φ<0° if the actuator 11 were not provided with the auxiliary magnets 65, 67, i.e. if $k_{MM}$ were zero. Therefore, φ=0° would be the position of equilibrium of the rotor body 17 in the non-energized condition of the actuator 11 if $k_{MM}$ were zero. Since the auxiliary magnets 65, 67 are used, the position of equilibrium of the rotor body 17 in the non-energized condition of the actuator 11 corresponds to an angle of rotation φ=−sin⁻¹($k_{MM}/2k_{MS}$) and is situated between φ=−90° and φ=0°. As FIG. 1 shows, the rotor body 17 is provided with a stud 71 for co-operation with a mechanical stop 73 which is mounted to the actuator housing 15. The stud 71 and the mechanical stop 73 are mutually arranged in such a manner, that in a rest position of the rotor body 17, in which the stud 71 rests against the mechanical stop 73, the angle of rotation $\phi_0$>−sin⁻¹($k_{MM}/2k_{MS}$) and $\phi_0$ is situated between φ=−90° and φ=0° such as, for example, at −50° as show in FIG. 2a. In this manner, the rotor body 17 is urged into said rest position $\phi_0$ under the influence of the additional magnetostatic torque of the auxiliary magnets 65, 67 in the non-energized condition of the actuator 11. The auxiliary magnets 65, 67 given a suitable strength such that, for example, $k_{MM}>2k_{MS}$. In this manner, the rotor body 17 and the throttle valve 7 coupled to the rotor body 17 are firmly pressed against the mechanical stop 73 in the rest position when no current is supplied to the energizing means 29. Vibrations of the rotor body 17 and the throttle valve 7 in the rest position which may arise as a result of, for example, fluctuating flow forces exerted on the throttle valve 7, are thus prevented as much as possible.

As FIG. 1 shows, the rest position of the rotor body 17 and the throttle valve 7 corresponds to a so-called limp-home position of the throttle valve 7 in the air passage 3 which differs slightly from a so-called idling position of the throttle valve 7 in which the aperture of the air passage 3 is minimal. In the limp-home position of the throttle valve 7 which occurs when, for example, the electrical-energy supply of the throttle device fails, the aperture of the air passage 3 allows for a small air flow towards the combustion chambers of the internal-combustion engine, so that an emergency operation of the engine is still possible. The mechanical stop 73 is mechanically adjustable, so that the air flow through the air passage 3 in the limp-home position of the throttle valve 7 is adjustable.

The magnetostatic torque $T_{MS}$ depending on the angle of rotation substantially in accordance with the $-\sin(2\phi)$ function has the following effect. It follows from equation [1] that $T_R=k_{EM}.\cos(\phi).(I-k_{MM}/k_{EM})$ if the actuator 11 were not provided with a magnetostatic torque $T_{MS}$, i.e. if $k_{MS}$ were zero. Therefore, if $k_{MS}$ were zero, $T_R$ would have a positive value for $I>k_{MM}/k_{EM}$ and a negative value for $I<k_{MM}/k_{EM}$ for every value of $\phi$ between $-90°$ and $+90°$, i.e. the rotor body 17 would be urged into the position $\phi=+90°$ for $I>k_{MM}/k_{EM}$ and into the rest position $\phi_0$ for $I<k_{MM}/k_{EM}$. In this situation, stable positions of the rotor body 17 between $\phi=\phi_0$ and $\phi=+90°$ could only be achieved if the actuator 11 were provided with a relatively complicated control unit such as, for example, an advanced digital control unit for controlling the value I of the current through the energizing means 29. Since the actuator 11 according to the invention is provided with the magnetostatic torque $T_{MS}$ which depends on the angle of rotation $\phi$ substantially in accordance with the $-\sin(2\phi)$ function, it follows from equation [1] that the resultant $T_R$ of the electromagnetic torque $T_{EM}$, the magnetostatic torque $T_{MS}$, and the additional magnetostatic torque $T_{MM}$ is zero for:

$$\phi_{TR=0}=\sin^{-1}\{(I.k_{EM}-k_{MM})/2k_{MS}\} \quad [2].$$

Figure 3A:
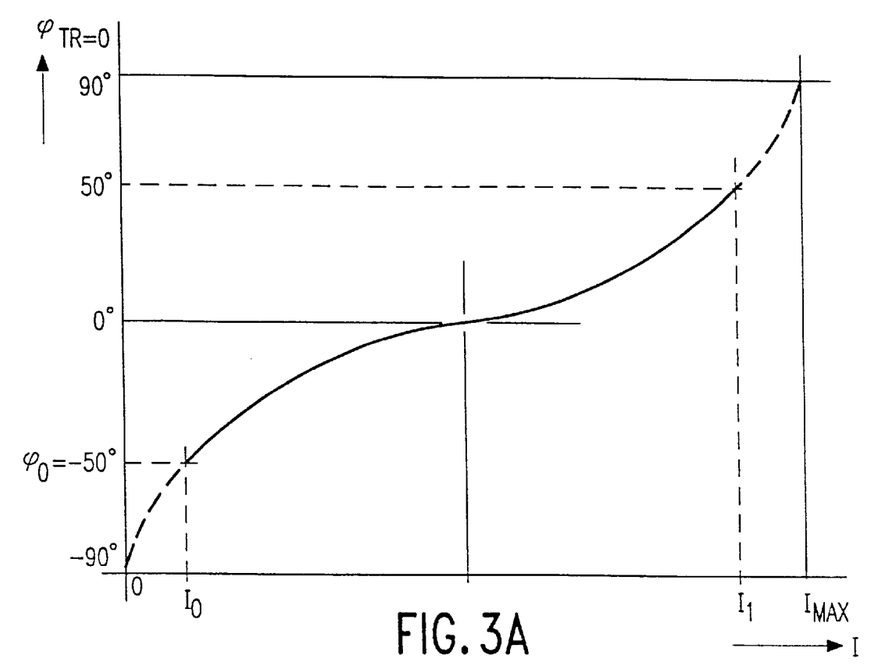
FIG. 3a shows a relation between an electrical current and a position of equilibrium in the electrical actuator of FIG. 2a, FIG. 3b shows a relation between an electrical current, an angle of rotation, and a resultant of an electromagnetic torque, a magnetostatic torque, and an additional magnetostatic torque in the electrical actuator of FIG. 2a, and FIG. 4 is a cross-section of a second embodiment of an electrical actuator according to the invention, applied in the throttle device of FIG. 1.

According to equation [2] the angle of rotation $\phi_{TR=0}$ in which $T_R=0$ is a function of the value I of the current through the energizing means 29. The relation between $\phi_{TR=0}$ and I according to equation [2] is shown in FIG. 3a for $\phi_0<\phi<+90°$ and is a one-to-one relation within this range of values of the angle of rotation $\phi$, i.e. each predetermined value I of the current through the energizing means 29 within the range $I_0<I<I_{MAX}$ shown in FIG. 3a defines a position of equilibrium $\phi$ of the rotor body 17 relative to the stator body 13 in which the resultant $T_R$ of the electromagnetic torque $T_{EM}$, the magnetostatic torque $T_{MS}$, and the additional magnetostatic torque $T_{MM}$ is zero.

From equation [1] it further follows that:

$$\delta T_R/\delta\phi=(k_{MM}-I.k_{EM}).\sin(\phi)-2k_{MS}.\{1-2.\sin^2(\phi)\} \quad [3].$$

It follows from equation [2] that the following relation applies in the positions of equilibrium of the rotor body 17:

$$k_{MM}-I.k_{EM}=-2k_{MS}.\sin(\phi) \quad [4].$$

After substitution of equation [4] in equation [3], it follows that the following relation applies in the positions of equilibrium of the rotor body 17:

$$(\delta T_R/\delta\phi)_{TR=0}=-2k_{MS}.\{1-\sin^2(\phi)\} \quad [5].$$

Since $1-\sin^2(\phi)>0$ in the range $\phi_0<\phi<+90°$, it follows that $(\delta T_R/\delta\phi)_{TR=0}<0$ in the range $\phi_0<\phi<+90°$, i.e. it is true for each position of equilibrium of the rotor body 17, in which $T_R=0$ for a predetermined value I of the current through the energizing means 29, that $T_R$ has a negative value if the angle of rotation $\phi$ increases as a result of, for example, external loads exerted on the rotor body 17 and said predetermined value I is maintained, and $T_R$ has a positive value if the angle of rotation $\phi$ decreases as a result of such external loads and said predetermined value I is maintained. As a result, the rotor body 17 is urged back into the position of equilibrium under the influence of the resultant $T_R$ if the position of equilibrium is disturbed under the influence of the external loads. Thus the resultant $T_R$ including the magnetostatic torque $T_{MS}$ depending on $\phi$ according to the $-\sin(2\phi)$ function has stabilizing properties in each and every position of equilibrium of the rotor body 17 within the range $\phi_0<\phi<+90°$.

Since the position of equilibrium of the rotor body 17 is determined by the value I of the current through the energizing means 29 and the resultant $T_R$ has stabilizing properties in each position of equilibrium, the electrical actuator 11 according to the invention can operate satisfactorily with a comparatively simple control unit such as, for example, a simple analog control unit 75 for controlling the angle $\phi$ of the rotor body 17 relative to the stator body 13. The control unit 75 is schematically shown in FIG. 1 and comprises a first electrical input 77 for receiving an electrical input signal $u_\phi$ corresponding to a desired value of the angle of rotation from, for example, an electronic motor-management system of the internal-combustion engine not shown in FIG. 1. The control unit 75 further comprises a second electrical input 79 for receiving an electrical input signal $u_M$ corresponding to an actual value of the angle of rotation from a sensor 81 mounted to the throttle-valve housing 1 for measuring the actual angle of rotation of the shaft 9 and the throttle valve 7 coupled to the shaft 9. The control unit 75 comprises an electrical output 83 for supplying an electrical output signal $u_I$ which is proportional to a value I of the current through the energizing means 29 and is supplied to an amplifier not shown in FIG. 1.

Figure 3B:
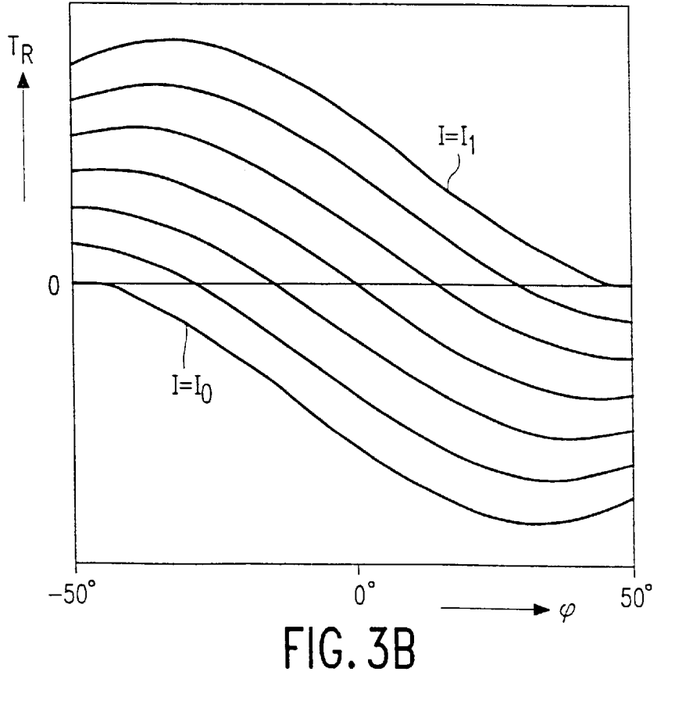

The operation of the electrical actuator 11 according to the invention is as follows. If no current is supplied to the energizing means 29, the rotor body 17 is in the rest position $\phi_0$ and the throttle valve 7 is in the limp-home position as discussed above. In the example shown in FIGS. 2a and 3a, $\phi_0=-50°$. When a current is supplied to the energizing means 29, the rotor body 17 remains in the rest position $\phi_0$ as long as $I<I_0$, $I_0$ being a threshold value for which $T_R=0$ in the rest position $\phi_0$. If $I>I_0$, the rotor body 17 is pivoted under the influence of the resultant $T_R$ through a limited angle of rotation towards a position of equilibrium $\phi_{TR=0}$ which is determined by the value I of the current through the energizing means 29 substantially in accordance with equation [2]. The position of equilibrium $\phi_{TR=0}$ is increased if the value I of the current is increased, whereas it is decreased if the value I of the current is decreased. In the example shown in the FIGS. 1, 2a and 3a, the value $\phi=-40°$ corresponds to the idling position of the throttle valve 7 in which the aperture of the air passage 3 is minimal. Therefore, the value $\phi=+50°$ corresponds to a so-called full-throttle position of the throttle valve 7 in which the aperture of the air passage 3 is maximal. This full-throttle position, which is reached for $I=I_1$, is also indicated in FIG. 3a. It is noted that the throttle device may be provided with a further mechanical stop for limiting the rotation of the rotor body 17 and the throttle valve 7 at the full-throttle position. FIG. 3b shows the relation between the resultant $T_R$ and the angle of rotation $\phi$ for $I_0<I<I_1$ within the range $-50°<\phi<+50°$.

Figure 4:
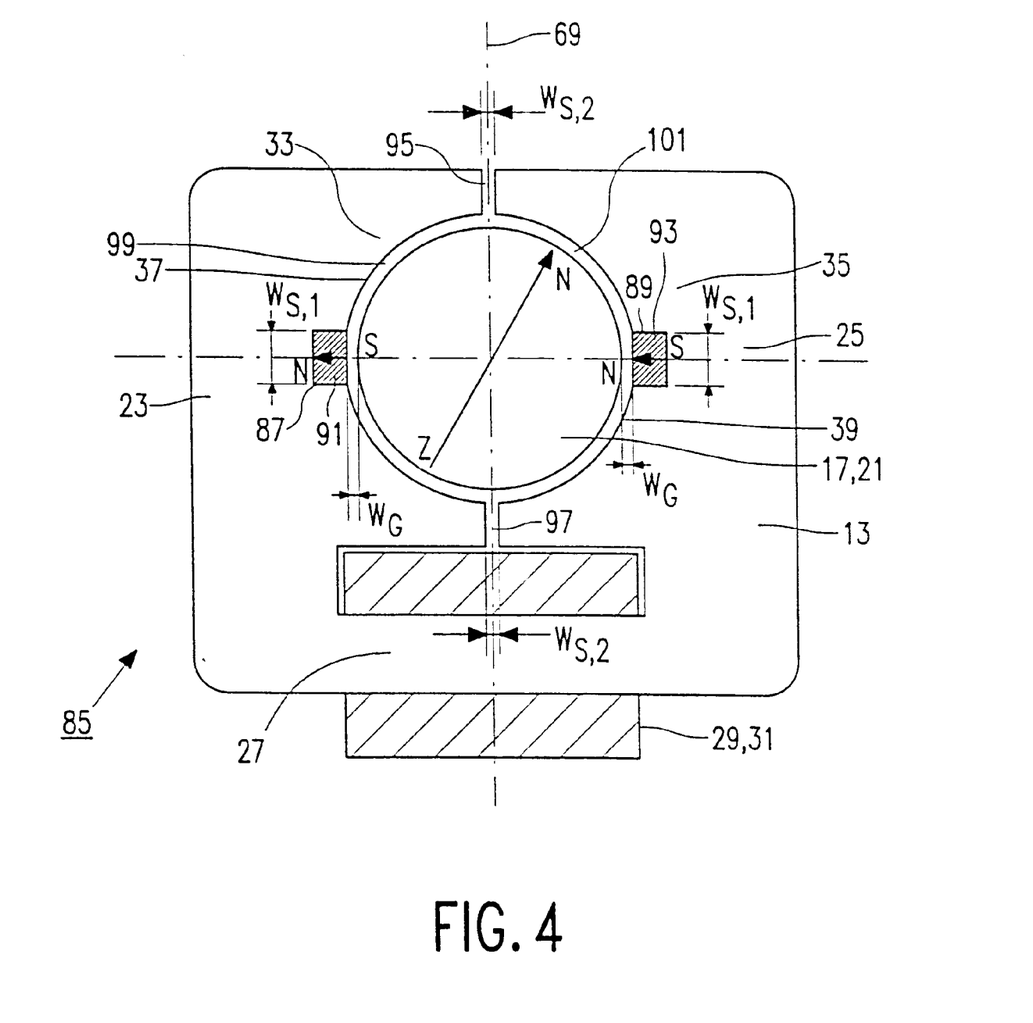

In the electrical actuator 11 described above, the $-\sin(2\phi)$ function according to which the magnetostatic torque $T_{MS}$ depends on the angle of rotation $\phi$ is achieved in a very simple and practical manner by providing the stator body 13 with the first slot 45, the second slot 47, the third slot 49, the fourth slot 51, and the gaps 41 and 43. FIG. 4 shows a second embodiment of an electrical actuator 85 according to the invention which is also provided with a magnetostatic torque $T_{MS}$ depending on the angle of rotation $\phi$ substantially in accordance with a $-\sin(2\phi)$ function. In FIG. 4 parts of the electrical actuator 85 which correspond to parts of the actuator 11 described before are indicated by corresponding reference signs. In the electrical actuator 85 a first slot 87 is centrally provided in the curved surface 37 of the pole shoe 33, and a second slot 89 is centrally provided in the curved surface 39 of the pole shoe 35, the first slot 87 and the second slot 89 being diametrically opposed o.e.s.o. the rotor body 17 and having an equal width $W_{S1}$. A first permanent auxiliary magnet 91 is accommodated in the first slot 87, while in the second slot 89 a second permanent auxiliary magnet 93 is accommodated, the auxiliary magnets 91, 93 being magnetized in directions corresponding to the directions in which the auxiliary magnets 65, 67 of the actuator 11 described above are magnetized. Furthermore, the pole shoes 33, 35 of the actuator 85 are mutually separated by a third slot 95 situated at a side of the rotor body 17 remote from the energizing means 29, and by a fourth slot 97 situated at a side of the rotor body 17 facing the energizing means 29, the third slot 95 and the fourth slot 97 being diametrically opposed o.e.s.o. the rotor body 17 and having an equal width $W_{2S}$. As shown in FIG. 4, the width $W_{S1}$ of the first slot 87 and the second slot 89 is substantially larger than the width $W_{S2}$ of the third slot 95 and the fourth slot 97. Between the curved surface 37 and the rotor body 17 a gap 99 is present having a substantially uniform gap width $W_G$, while between the curved surface 39 and the rotor body 17 a gap 101 is present having a substantially uniform gap width $W_G$ which is equal to the gap width of the gap 99. The $-\sin(2\phi)$ function according to which the magnetostatic torque $T_{MS}$ depends on the angle of rotation is achieved in a very simple and practical manner in that the stator body 13 of the electrical actuator 85 is provided with the first slot 87, the second slot 89, the third slot 95, and the fourth slot 97 having said different slot widths $W_{S1}$ and $WS_{S2}$. Furthermore, the actuator 85 is provided with an electromagnetic torque corresponding to the electromagnetic torque of the actuator 11, and with an additional magnetostatic torque corresponding to the additional magnetostatic torque of the actuator 11.

In the electrical actuators 11 and 85 described above, the electromagnetic torque $T_{EM}$ is substantially proportional to the value I of the current through the energizing means 29 and is dependent on the angle of rotation $\phi$ substantially in accordance with a $\cos(\phi)$ function, whereas the magnetostatic torque $T_{MS}$ is dependent on the angle of rotation $\phi$ substantially in accordance with a $-\sin(2\phi)$ function. It is noted that the invention also covers electrical actuators in which an electromagnetic torque is substantially proportional to a value of a current through an energizing means of the actuator and is dependent on an angle of rotation of a rotor body relative to a stator body of the actuator in accordance with a first function of the angle of rotation, and in which a magnetostatic torque is dependent on the angle of rotation in accordance with a second function of the angle of rotation. According to the invention, stable positions of equilibrium of the rotor body relative to the stator body which are each determined by a predetermined value of the current through the energizing means are achieved in such an actuator if said first function is substantially different from said second function, while it is true for each position of equilibrium that the resultant of the electromagnetic torque and the magnetostatic torque has a negative value if the angle of rotation increases, and the resultant has a positive value if the angle of rotation decreases. Such first and second functions being different from the above mentioned $\cos(\phi)$ and $-\sin(2\phi)$ functions can be achieved by a suitable shape, suitable dimensions, and suitable physical and materials properties of the rotor body, the stator body, and the energizing means. An example of such alternative first and second functions is a first function substantially corresponding to $[1-\{2\phi/\pi\}^2]$ and a second function substantially corresponding to $-\phi \cdot [1-\{2\phi/\pi\}^2]$.

It is further noted that the invention also covers electrical actuators which are not provided with an auxiliary magnet for exerting an additional magnetostatic torque on the rotor body. As discussed above, the auxiliary magnets are used to optimize the position of equilibrium of the rotor body in the non-energized condition of the actuator, and do not detract from the stabilizing properties of the resultant of the electromagnetic torque and the magnetostatic torque.

It is finally noted that an electrical actuator according to the invention may also be applied in other devices in which the angular position of a shaft should be controlled to a constant or variable reference value. The electrical actuator may, for example, be used in servo-actuated valves in chemical plants and power stations or in devices for deflecting the control surfaces of an aircraft. The actuator may be used as a so-called prime actuator without a transmission, in which case the actuator directly drives a body which is to be pivoted, as in the embodiments of the invention described above, or in combination with a transmission for converting a rotational motion into another rotational motion or into a linear motion, in which case the linear position of a body can be accurately controlled by the electrical actuator.

What is claimed is:

1. An electrical actuator comprising:
   a magnetically permeable stator body;
   a permanent magnet rotor body which is pivotable relative to the stator body about an axis of rotation through a limited angle of rotation, the stator body having two pole shoes which are diametrically opposed in relation to the rotor body;
   electrical energizing means for exerting an electromagnetic torque on the rotor body;
   wherein the two pole shoes respectively have a first slot and a second slot provided therein, the first and second slots being diametrically opposed in relation to the rotor body, the two pole shoes are mutually separated by a third slot and a fourth slot which are diametrically opposed in relation to the rotor body, and
   wherein between the pole shoes and the rotor body a first gap is formed having a first width on each side of the first and second slots which is larger than a second width of a second gap formed on each side of the third and fourth slots.

2. An electrical actuator as claimed in claim 1, characterized in that the stator body comprises a permanent auxiliary magnet for exerting an additional magnetostatic torque on the rotor body.

3. An electrical actuator as claimed in claim 1, wherein the first and second slots are greater in width than the third and fourth slots.

4. An electrical actuator as claimed in claim 1, wherein said electromagnetic torque being substantially proportional to the value of an electrical current supplied to the energizing means and also being dependent on a first function of an angle of rotation ($\phi$) of the rotor body relative to the stator body;

the stator body further exerting a magnetostatic torque on the rotor body which is dependent on a second function of said angle of rotation ($\phi$), the second function being different from said first function; and     wherein for each position of equilibrium of the rotor body, in which the current has a predetermined value and the sum of the electromagnetic torque and the magnetostatic torque is substantially zero, said sum will have a negative value if the angle of rotation increases and will have a positive value if the angle of rotation decreases, thereby stabilizing each position of equilibrium against disturbing influences acting on the rotor body.

5. An electrical actuator as claimed in claim 4, wherein the rotor body comprises a permanent magnet which is diametrically magnetized, the first function comprises a $\cos(\phi)$ function, and the second function comprises a $-\sin(2\phi)$ function.

6. A throttle device for use in an air inlet of an internal-combustion engine, which throttle device comprises a throttle-valve housing, an air passage which is connectable to the air inlet, a throttle valve which is journaled in the throttle-valve housing so as to be pivotable in the air passage, and an electrical actuator for pivoting the throttle valve, characterized in that the electrical actuator is an electrical actuator as claimed in claim 1.

7. A electrical actuator as claimed in claim 1, characterized in that the stator body comprises a first permanent auxiliary magnet in the first slot and a second permanent auxiliary magnet in the second slot, said auxiliary magnets being magnetized in the same directions and producing an additional magnetostatic torque on the rotor body of a magnitude substantially in accordance with a $-\cos(\phi)$ function of the angle of rotation of the rotor body.

* * * * *